(No Model.)
J. B. COOPER.
HOSE LEAK STOP OR JACKET.
No. 518,805. Patented Apr. 24, 1894.
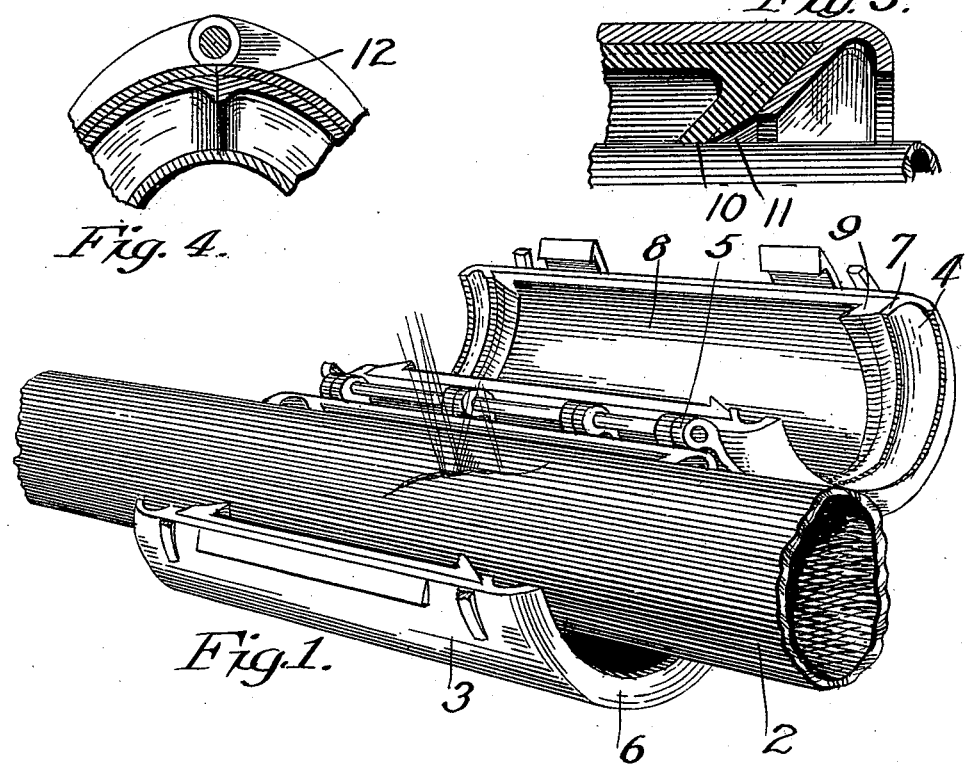
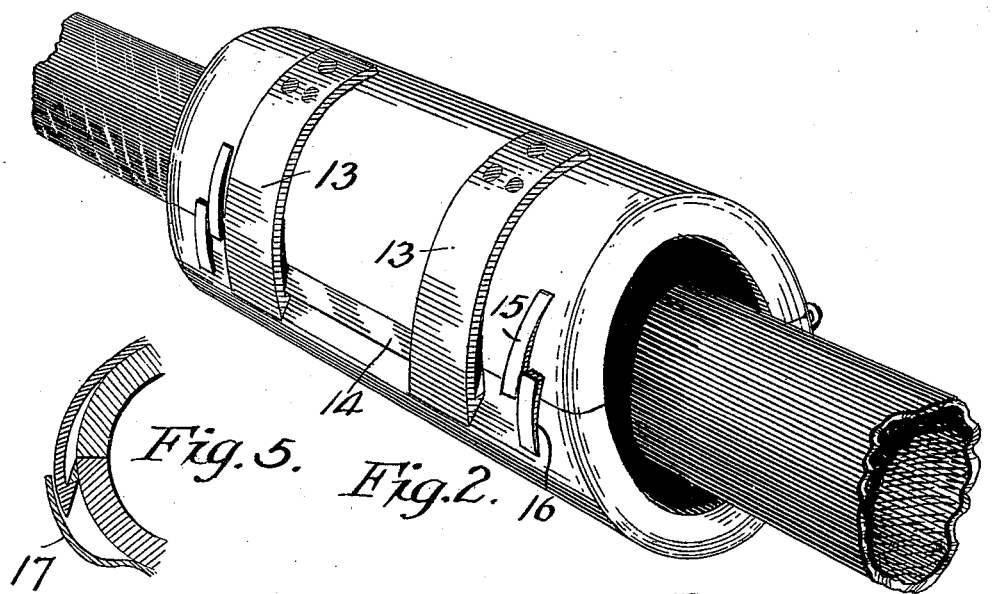
Witnesses
W. E. Gooby
C. E. Van Doren.
Inventor
James Brooks Cooper.
By Paul D Hawley
his Attorneys.
THE NATIONAL LITHOGRAPHING COMPANY,
WASHINGTON, D. C.

UNITED STATES PATENT OFFICE.

JAMES BROOKS COOPER, OF MINNEAPOLIS, MINNESOTA, ASSIGNOR OF ONE-FOURTH TO CHARLES M. WAY, OF SAME PLACE.

HOSE-LEAK STOP OR JACKET.

SPECIFICATION forming part of Letters Patent No. 518,805, dated April 24, 1894.

Application filed September 4, 1893. Serial No. 484,685. (No model.)

*To all whom it may concern:*

Be it known that I, JAMES BROOKS COOPER, of the city of Minneapolis, county of Hennepin, State of Minnesota, have invented a certain new and Improved Automatic Hose-Leak Stop or Jacket, of which the following is a specification.

My invention relates primarily to means for stopping leaks in hose, particularly fire-hose bursting or leaking while in use; and the object of my invention is to provide a leak-stop device or jacket which may be readily and easily applied while pressure is on the pipe or hose; and one which will fit different sizes of hose; one which may be used to connect or couple pieces of hose of different diameters; one in which the pressure will be the same inside and outside of that part of the hose surrounded by the sleeve or jacket; one which may be used over a leaky coupling of the ordinary construction; one which will be not only water but air tight; and finally a device which will not be unlocked when the hose is drawn along the ground.

With the above in view, my invention consists in general in the construction and combinations hereinafter described and particularly pointed out in the claims.

The invention will be more readily understood by reference to the accompanying drawings, in which—

Figure 1 is a perspective view showing my device open. Fig. 2 shows the same closed over a hose. Fig. 3 is an enlarged sectional detail showing the construction of the inside rubber lining and lips. Fig. 4 is a partial transverse section showing the longitudinal meeting edges of the lining. Fig. 5 is a transverse sectional detail showing the guard plate arranged to prevent the unlocking of the clasps.

As shown in the drawings, the jacket or sleeve proper is composed of two semicircular metal halves 3 and 4, connected by a suitable hinge 5 and when closed presenting the appearance of a sleeve having curved ends 6 with large openings therein. Within the two parts of the jacket are the inwardly inclined flanges 7, preferably made integral therewith, and in each half of the jacket I provide a flexible lining 8, preferably made of rubber, and the ends fitting beneath the corners of the flanges 7. The lining is provided with the inwardly extending and inclined flexible lips or flanges 9, which are preferably provided with two differently inclined packing surfaces 10—11, adapting the device for use with hose or pipe of varying sizes. The linings are somewhat larger than the inside of the jacket and the longitudinal edges thereof are flared outwardly somewhat as shown at 12 in Fig. 4. The result is that when the parts are closed together these edges meet firmly to form water and air tight joints.

The parts may be fastened together in any desired manner, but I prefer to use spring hooks or clasps 13 adapted to slip down over the shoulder 14 provided upon the lower part. For keeping the two parts in alignment I preferably provide the lugs 15—16 upon the adjacent edges of the two parts, which lugs just pass one another and prevent longitudinal movement of one part with respect to the other. To prevent the unlocking of the spring hooks 13, except when pried away, I preferably provide a small seal 17 upon the lower part, the same projecting slightly above the lower ends of the hooks to prevent the same from being struck by anything upon the ground when the pipe is drawn along.

2 represents a water or air pipe or hose which has burst or broken. The hose is laid in the lower half of the jacket and the upper part closed down over the same. The space within the jacket between the lining and the pipe will be immediately filled with water flowing out from the leak in the pipe and the result will be that the flexible lips or flanges 9 will be distended and held firmly against and around the hose or pipe not only by their own spring but more so by the pressure of the water exerted against the inner shoulders of the flexible lips. The equalization of the pressure within and without the broken part of the pipe in this way forms one of the greatest advantages of my device, as the further tearing or breaking of the pipe or hose is effectually prevented. It will be observed further, that a hose or pipe of any size greater than the normal opening between the flexible lips and of any size less than the opening between the metal flanges 7 may be held in the jacket or leak-stop; and further, that the space within the jacket is sufficiently large to take in an ordinary coupling used in joining sections of hose or pipe. The leak-stop is also available where a leak occurs in the coupling of sections of pipe or hose of different diameters, the flexible lips contracting or expanding to fit either. By the employment of the double beveled lips, I am enabled to insure water tight joints without danger of so expanding or stretching the flexible lips as to tear the same. It is obvious that the lining itself may be made sufficiently stiff for use without a separate packing or jacket; and further that the metal parts of the lining may be omitted, the flexible lips being alone employed with an independent jacket.

Having thus described my invention, I claim as new and desire to secure by Letters Patent—

1. A leak stop, consisting in a sleeve adapted to be closed about a pipe or hose and considerably larger than the same, and said sleeve provided with the flexible and inwardly flared lips or flanges adapted to be forced against and around the hose or pipe by their own elasticity and by pressure of air or water within the sleeve, substantially as described.

2. The sleeve or jacket divided longitudinally, in combination, with means for securing the two parts about a hose or pipe, the ends of said sleeve or jacket being provided with the inwardly flared flexible annular lips or flanges adapted to be forced against and around the pipe or hose by pressure of air or water within the space between the jacket and the pipe or hose, substantially as described.

3. The combination, with the metal sleeve or jacket provided with the inwardly flared metal flanges 7, of the flexible packing rings held in place by the metal flanges, and themselves being flared inwardly, whereby said rings are adapted to be forced against a pipe or hose by pressure of air or water within the sleeve, substantially as described.

4. The combination, with the inflexible sleeve, or jacket having the inflexible internal flanges, of the flexible lining provided with the inwardly extending and inwardly flared beveled lips or flanges 9, substantially as described and for the purpose set forth.

5. The combination, with the divided sleeve arranged to be locked upon a pipe or hose, of the acute-angled and inwardly-flared flexible packing flanges, said flanges having the two outward bevels 10 and 11, substantially as described.

6. The combination, of the metal jacket or sleeve composed of the hinged parts, and having in its ends the inwardly flared acute-angled flanges or lips, with the clasp 13 upon one of the hinged parts, the shoulder upon the other part to be engaged by said clasp, a seal to prevent the unlocking of said clasps, and the guide lugs 15 and 16 upon opposite parts, substantially as described.

7. The combination, with the metal jacket composed of the hinged parts arranged to be locked about a hose or pipe, and considerably larger than the same, of the two-part flexible lining for said jacket, said lining being somewhat larger than the jacket, whereby the longitudinal edges of the lining are pressed together upon closing the jacket, and said lining provided with the acute-angled inwardly-flared flexible flanges or lips to engage a pipe or hose, substantially as described.

In witness whereof I have hereunto set my hand this 30th day of August, 1893.

JAMES BROOKS COOPER.

In presence of—
C. G. HAWLEY,
M. E. GOOLEY.